(12) United States Patent
Arslan et al.

(10) Patent No.: US 11,501,656 B2
(45) Date of Patent: Nov. 15, 2022

(54) INTERACTIVE AND AUTOMATED TRAINING SYSTEM USING REAL INTERACTIONS

(71) Applicant: SESTEK SES VE ILETISIM BILGISAYAR TEK. SAN VE TIC A.S., Istanbul (TR)

(72) Inventors: Mustafa Levent Arslan, Istanbul (TR); Anil Ayhan, Istanbul (TR)

(73) Assignee: SESTEK SES VE ILETISIM BILGISAYAR TEK. SAN VE TIC A.S., Istanbul (TR)

( * ) Notice: Subject to any disclaimer, the term of this patent is extended or adjusted under 35 U.S.C. 154(b) by 1053 days.

(21) Appl. No.: 16/172,872

(22) Filed: Oct. 29, 2018

(65) Prior Publication Data

US 2020/0135041 A1    Apr. 30, 2020

(51) Int. Cl.
| | | |
|---|---|---|
| *G09B 7/08* | (2006.01) | |
| *G06Q 10/06* | (2012.01) | |
| *G06F 16/901* | (2019.01) | |
| *G10L 15/26* | (2006.01) | |

(52) U.S. Cl.
CPC ............ *G09B 7/08* (2013.01); *G06F 16/9024* (2019.01); *G06Q 10/06398* (2013.01); *G10L 15/26* (2013.01)

(58) Field of Classification Search
CPC ..... G09B 7/08; G06Q 10/06398; G10L 15/26
USPC ........................................................ 434/322
See application file for complete search history.

(56) References Cited

U.S. PATENT DOCUMENTS

| | | | | |
|---|---|---|---|---|
| 2014/0250227 A1* | 9/2014 | Slovacek | ................ | H04L 43/10 709/224 |
| 2016/0125419 A1* | 5/2016 | Arslan | .................... | G10L 25/51 705/304 |
| 2016/0328986 A1* | 11/2016 | Corpus | .................... | G09B 7/06 |
| 2017/0116982 A1* | 4/2017 | Gelfenbeyn | ........ | G10L 15/1815 |

* cited by examiner

*Primary Examiner* — Ahmad F. Matar
*Assistant Examiner* — Jirapon Intavong
(74) *Attorney, Agent, or Firm* — Bayramoglu Law Offices LLC (57) ABSTRACT

An interactive and automated training system, including a training portal having a training database, a training material creating module including a recorder and a dialogue identifier, a training and practicing module for training and practicing interactively with a trainee user, and a testing module for providing test case scenarios and grading a performance level of the trainee user. The recorder records real time interaction between an employee and a customer. The dialogue identifier differentiates the real time interaction into an employee dialogue and a customer dialogue, and provides indexing of subparts of the real time interaction. The training material creating module stores the real time interaction into the training database along with indexing data of the subparts of the real time interaction. The training material creating module categorizes a plurality of real time interactions stored in the training database into a plurality of training scenarios.

15 Claims, 10 Drawing Sheets

Fig. 7D

INTERACTIVE AND AUTOMATED TRAINING SYSTEM USING REAL INTERACTIONS

TECHNICAL FIELD

The present invention relates to the field of automated training systems, particularly to an interactive and automated training system which uses real interactions.

BACKGROUND

In the service industry, interaction with customers/clients and customer care representatives is very common for providing the proper services. Organizations are required to train the customer care representatives or agents for handling the interactions with the clients or customers properly. Professional groups communicating directly with customers (people), need to learn and internalize a significant amount of information, including a variety of policies, procedures and products, so they can perform tasks competently as per the standards in that particular service sector and the standards of the organization. In order to adapt to the changes and updates as well as to a large amount of information, it is necessary to keep the knowledge of the persons in the professional groups updated. In order to achieve professional standards, the employees have to reach the desired performance levels, and in order to be able to achieve these performance levels, it is necessary to allocate important resources for the training of the employees.

Conventionally, such training is often provided by a human trainer and the performance levels of the employees are analyzed manually. For example, during the training of new employees at work in call centers, experienced employees train the new employees by acting as customers in order to simulate actual customer interviews; or a medical student/candidate in a medical college is given the opportunity to practice with actors pretending to be patients in order to gain exposure of doctor-patient interactions, Such manual training programs not only consume a lot of man hours but also prove very costly for the organization.

SUMMARY

An interactive and automated training system includes a training database, a training material creating module including a recorder and a dialogue identifier, a training and practicing module for training and practicing interactively with a trainee user, and a testing module for providing test case scenarios and grading a performance level of the trainee user. The recorder is configured to record a real time interaction between an employee and a customer. The real time interaction is a written communication or an oral communication between the employee and the customer. The dialogue identifier is configured to differentiate the real time interaction into an employee dialogue and a customer dialogue and provides indexing of subparts of the real time interaction. The training material creating module stores the real time interaction into the training database along with indexing data of the subparts of the real time interaction. The training material creating module is configured to categorize a plurality of real time interactions stored in the training database into a plurality of training scenarios. The training database is accessible to the trainee user through the training and practicing module. The training and practicing module includes an output device for providing an output to the trainee user, and an input device for receiving an input from the trainee user for interactive training and practice. The input device may be a keyboard or a microphone.

Preferably, the real time interaction is a written interaction or an oral interaction.

Preferably, the real time interaction is an oral interaction, the recorder is an audio recorder and the dialogue identifier is a speech recognition device capable of differentiating voice of different speakers in the oral interaction.

Preferably, the training material creating module includes a speech to text converter, the speech to text converter converts the oral interaction into a text and the training material creating module stores the text into the training database.

Preferably, the training material creating system includes a speaker diarisation system for differentiating the voice of different speakers.

Preferably, the training database is configured to be amended directly by an input from a trainer.

Preferably, the training and practicing module is configured to interact with the trainee user based on a training scenario selected by the trainee user from the plurality of training scenarios.

Preferably, the testing module provides a test case scenario corresponding to the training scenario selected by the trainee user and records a response of the trainee user.

Preferably, the testing module analyzes the response of the trainee user and is configured to provide a score based on a predetermined testing criteria.

Preferably, the testing module compares an intent of the response of the trainee user with an intent of a desired response in the training database and provides the score based on a degree of match between the intent of the response of the trainee user and the predetermined response in the training database.

Preferably, the testing module is configured to display the desired response to the user trainee.

A method for implementing an interactive and automated training system, the method includes:
storing a plurality of interaction files having a conversation between a customer and an employee into a training database;
determining a customer dialogue and an employee dialogue in each interaction file;
assigning a first identifier corresponding to the customer dialogue and a second identifier corresponding to the employee dialogue;
determining a timing stamp of each part of the customer dialogue and each part of the employee dialogue;
assigning a timing identifier to the each part of the customer dialogue and the each part of the employee dialogue based on the timing stamp and a timing duration of the each part of the customer dialogue and the each part of the employee dialogue respectively; and categorizing each interaction file according to a plurality of training scenarios.

Preferably, the interaction file is an audio file and if the interaction file is a mono audio file, the step of determining the customer dialogue and the employee dialogue in each interaction file is performed by a speaker diarisation system.

Preferably, the method further includes converting the audio file into a text by a speech to text converter; wherein, the customer dialogue and the employee dialogue are determined by parsing the text.

Preferably, the method further includes creating a lookup table for similar words or similar words based on an intent of the customer in the customer dialogue and an intent of the employee in the employee dialogue.

A method for using the interactive and automated training system for training a new employee, the method includes:
selecting a mode of training, wherein the mode of training is one selected from the group consisting of a practice mode, a query mode and a test mode;
when the mode of training is the practice mode:
receiving a practice input from the trainee user to select one training scenario from the plurality of training scenarios; and
initiating an interactive conversation between the trainee user and the interactive and automated training system corresponding to the one training scenario from the training database, wherein the interactive and automated training system plays a role of the customer in the interactive conversation;
when the mode of training is the query mode:
receiving a query input from the trainee user, wherein the query input is a question or a training scenario input;
searching the training database for the query input; and
providing an answer corresponding to the query input from the training database through an output device;
when the mode of training is the test mode:
receiving a test input from the trainee user to select at least one training scenario from the plurality of training scenarios;
providing an interactive quiz corresponding to the test input to the trainee input to the trainee user;
recording response of the trainee user for each question of the quiz;
comparing the response of the trainee user for the each question of the quiz with desired answers for the each question of the quiz and providing a test score; and
providing the desired answer of at least all wrong answers to the trainee user.

Preferably, the mode of training is the test mode and the interactive quiz is an interactive conversation stored in the training database corresponding to the training input. The response of the trainee user is compared with the employee dialogue of the interactive conversation stored in the training database corresponding to the training input.

Preferably, at end of the interactive quiz, the interactive and automated training system displays a total test score of the trainee user.

Preferably, at end of the interactive quiz, the interactive and automated training system displays the interactive conversation corresponding to the training input on a display screen.

Preferably, the method further includes adding the test score in a record of the trainee user stored in the training database and providing a snapshot of all test scores and a performance graph of the trainee user.

BRIEF DESCRIPTION OF THE DRAWINGS

For a better understanding of the invention and to show how the invention may be performed, embodiments thereof will now be described, by way of non-limiting example only, with reference to the accompanying drawings, in which.

DETAILED DESCRIPTION

Figure 1:
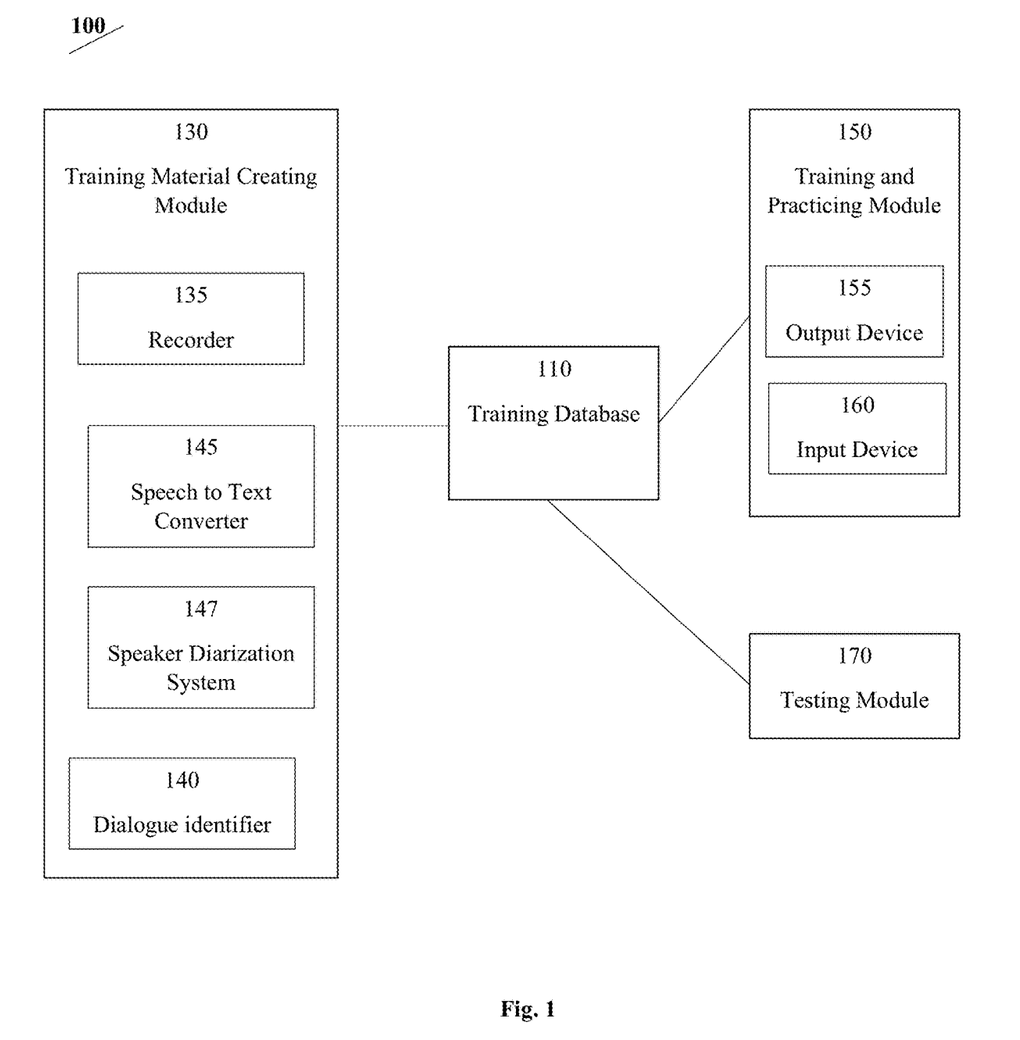
FIG. 1 shows a block diagram of an interactive and automated training system according to an embodiment.

Referring to FIG. 1, interactive and automated training system 100 includes training database 110, training material creating module 130, training and practicing module 150 for training and practicing interactively with a trainee user, and testing module 170 for providing test case scenarios and grading a performance level of the trainee user. The training material creating module 130 includes recorder 135 and dialogue identifier 140. The recorder 135 is configured to record a real time interaction between an employee and a customer. The real time interaction is a written communication or an oral communication between the employee and the customer. The dialogue identifier 140 differentiates the real time interaction into an employee dialogue and a customer dialogue, and performs indexing of subparts of the real time interaction. The training material creating module 130 stores the real time interaction into the training database 110 along with indexing data of the subparts of the real time interaction. The training material creating module 130 is configured to categorize a plurality of real time interactions stored in the training database 110 into a plurality of training scenarios. The training database 110 is accessible to the trainee user through the training and practicing module 150. The training and practicing module 150 includes output device 155 for providing an output to the trainee user, and input device 160 for receiving an input from the trainee user for interactive training and practice.

In another embodiment, the real time interaction is a written interaction or an oral interaction.

In another embodiment, the real time interaction is an oral interaction, the recorder 135 is an audio recorder and the dialogue identifier 140 is a speech recognition device capable of differentiating voice of different speakers in the oral interaction.

In another embodiment, the training material creating module 130 includes speech to text converter 145, the speech to text converter 145 converts the oral interaction into a text and the training material creating module 130 stores the text into the training database 110.

In another embodiment, the training material creating system includes speaker diarisation system 147 for differentiating the voice of different speakers.

In another embodiment, the training database is 110 configured to be amended directly by an input from a trainer.

In another embodiment, the training and practicing module 150 is configured to interact with the trainee user based on a training scenario selected by the trainee user from the plurality of training scenarios.

In another embodiment, the testing module 170 provides a test case scenario corresponding to the training scenario selected by the trainee user and records a response of the trainee user.

In another embodiment, the testing module 170 analyzes the response of the trainee user and is configured to provide a score based on a predetermined testing criteria.

In another embodiment, the testing module 170 compares an intent of the response of the trainee user with an intent of a desired response in the training database 110 and provides the score based on a degree of match between the intent of the response of the trainee user and the predetermined response in the training database 110. The comparison is done by comparing the complete interaction response of the trainee user with the complete desired response of the interaction in the database and also by comparing each subpart of the response of the trainee user with the corresponding desired subpart response in the training database. The overall score is based on the combination of scores obtained by the comparison of the complete response in the interaction and the comparison of all subparts of the complete interaction.

In another embodiment, various answers can be replicated by algorithms based on artificial intelligence and can be added to the training database. The algorithms based on artificial intelligence are implemented by Neural Network methods. The neural networks and algorithm provide the derivation of various possible answers with similar intent. For example: if a customer says "Hello", and a trainer responds "Hello". The neural networks and method may accept various similar answers like Hello, Hi, Hola, Howdie etc. as a correct response. Similarly, words or phrases having similar meanings can be replaced using these neural networks. So, it is not necessary that the response of the trainee is exactly the same as the words or phrases recorded in the training database.

In another embodiment, the testing module is configured to display the desired response to the user trainee.

Figure 2:
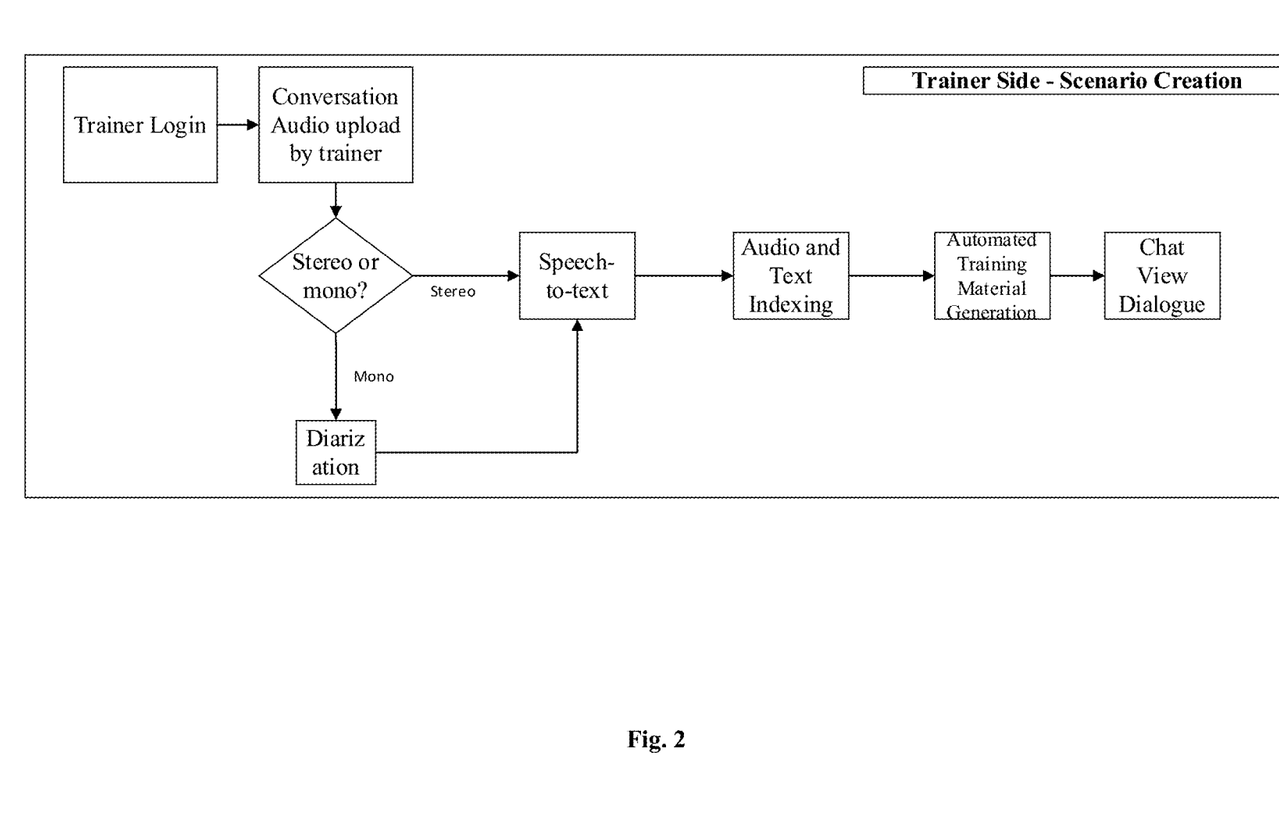
FIG. 2 shows a flow chart of a training scenario generation according to another embodiment.

Further referring to FIG. 2, a trainer login account is created for the selected experienced trainers or employees who have the access for adding the training material including the audio files or text chatting data of the real time interactive conversations to the training database 110 through the training material creating module. Only the selected experts and/or trainers in the organization have the authentication to update the training database by adding new training contents or by updating/modifying the existing training contents.

A trainer can create automated training scenarios quickly and easily using the interactive and automated training system. The trainer can create thousands of scenarios about what the trainee should do for different situations and scenarios. The trainer can prepare large number of educational contents with minimal checks in limited time.

Figure 3:
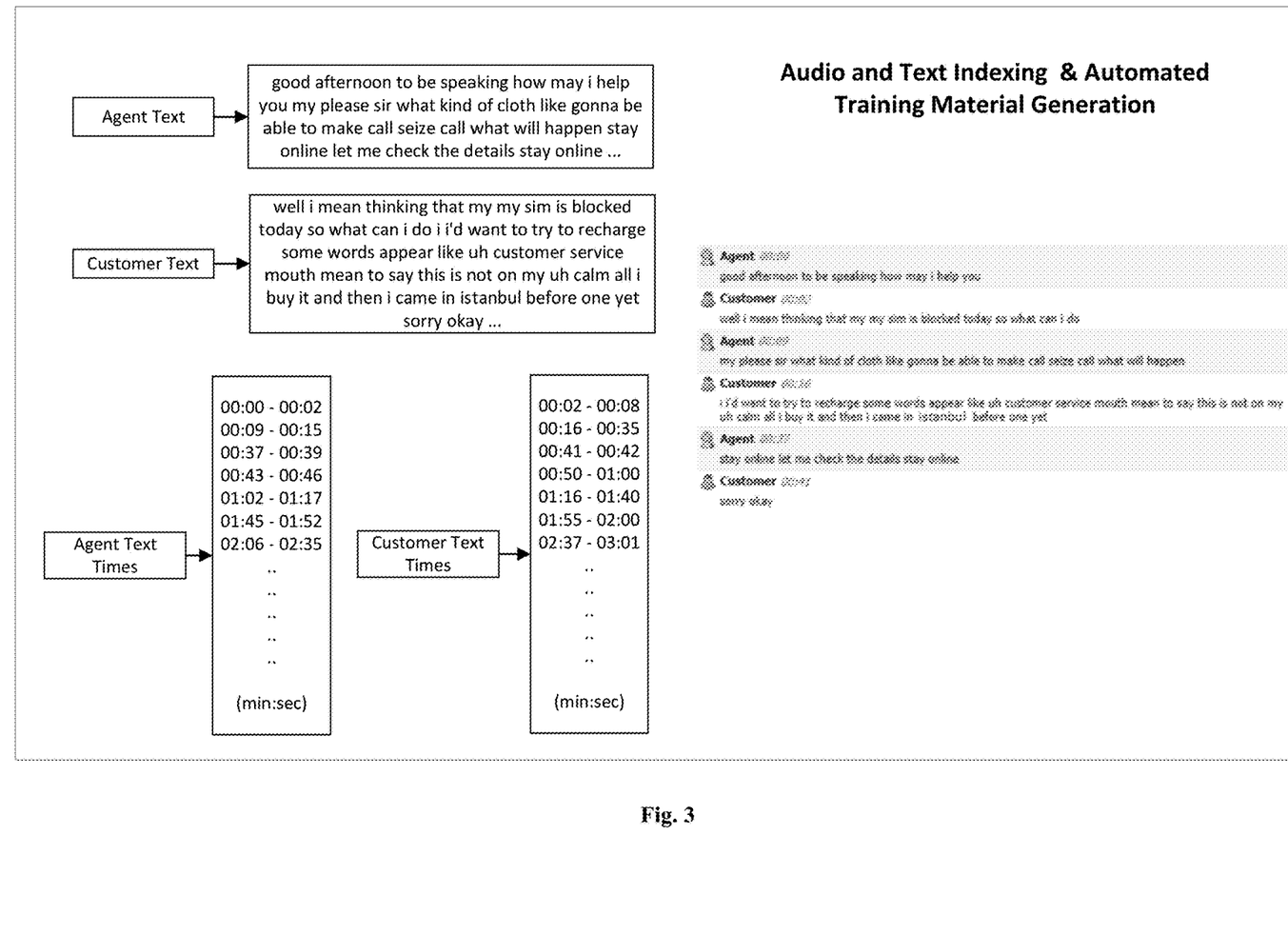
FIG. 3 shows audio and text indexing, and automated training material according to another embodiment.
Figure 4:
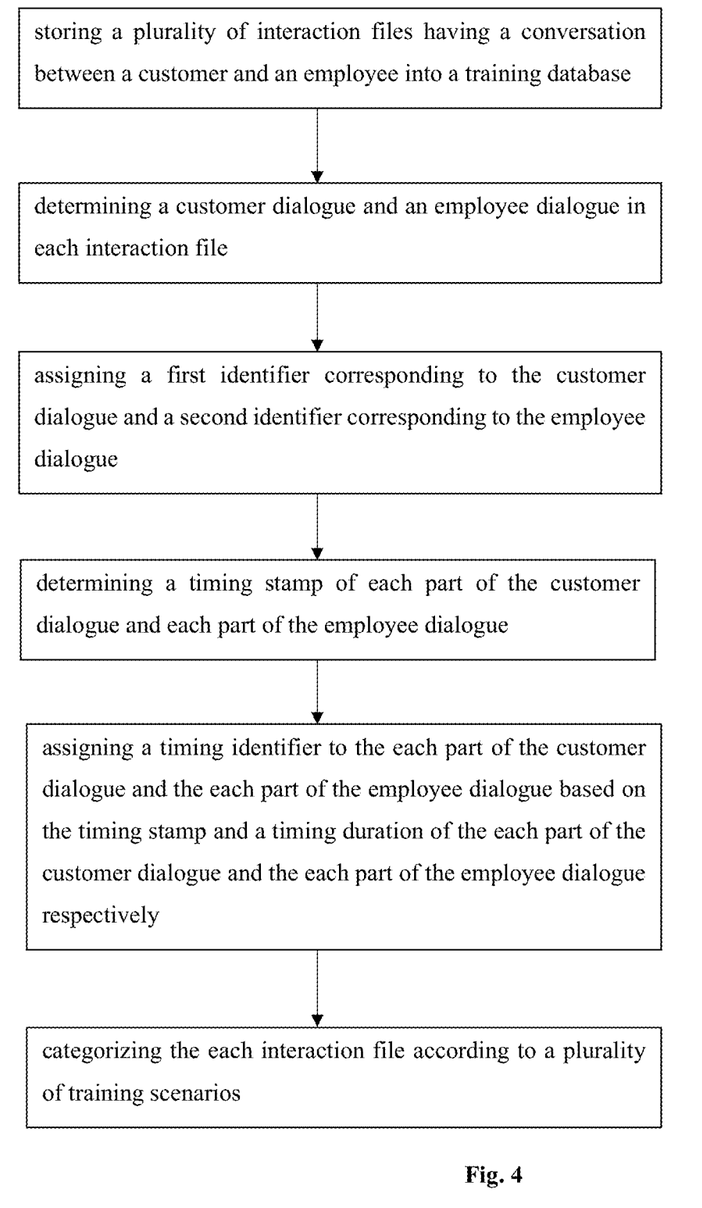
FIG. 4 shows a flowchart of a method for implementing an interactive and automated training system according to another embodiment.

Referring to FIGS. 2-4, a method for implementing an interactive and automated training system is provided. The method includes:
storing a plurality of interaction files having a conversation between a customer and an employee into a training database;
determining a customer dialogue and an employee dialogue in each interaction file;
assigning a first identifier corresponding to the customer dialogue and a second identifier corresponding to the employee dialogue;
determining a timing stamp of each part of the customer dialogue and each part of the employee dialogue;
assigning a timing identifier to the each part of the customer dialogue and the each part of the employee dialogue based on the timing stamp and a timing duration of the each part of the customer dialogue and the each part of the employee dialogue respectively; and
categorizing the each interaction file according to a plurality of training scenarios.

In another embodiment, the interaction file is a mono audio file and the step of determining the customer dialogue and the employee dialogue in each interaction file is performed by the speaker diarisation system 147.

Referring to FIG. 3, in another embodiment, the method further includes converting the audio file into a text by a speech to text converter. So, first the sound file is automatically partitioned into voiced subparts where each subpart is labeled with a speaker identity (customer or employee) and a time stamp (start/end seconds in the dialogue). This process can be done in two different ways according to the number of channels in the audio file: (a) If the sound file contains two channels (stereo) where each channel is used for a different speaker, the sound file is first separated into its channels and then each channel is fed into an energy-based Voice Activity Detection (VAD) module which partitions each speaker's speech into subparts; (b) If the sound file contains one channel (mono), the sound file is first fed into the energy-based Voice Activity Detection (VAD) module, which partitions the sound file into voiced subparts with unknown speaker identities. Then the speaker of each voiced subpart is determined by a speaker diarisation algorithm which uses deep neural networks. The customer dialogue and the employee dialogue are determined by parsing the text. FIG. 3 shows that first the audio file is dissected into the customer dialogue and the employee dialogue, then the subparts of the customer dialogue and the employee dialogue are respectively indexed with respect to the time stamps or relative time stamps and time duration of each subpart. The time stamps and time durations of each subpart of the employee and customer dialogue within an interactive conversation are very crucial to implement the interactive and automated training system effectively. This ensures to provide sufficient time and pause between the two speakers (i.e. the customer and the employee) as per the real-time conversation to provide proper pauses and time duration for the employee (i.e. the trainee user) and the customer (i.e. the interactive and automated training system, which plays the role of virtual customer for training purpose) creating a real-time type training environment. In case of a written customer interaction like an interaction over a chat, the dialogues of the customer and customer representative can be indexed as per the time stamps of each dialogue or different identifiers can be attached with the customer input and the customer representative input to differentiate and index the subparts of the complete conversation. The training material creating module 130 stores the real time interaction into the training database along with indexing data of the subparts of the real time interaction.

In another embodiment, the method further includes creating a lookup table for similar words or similar words based on an intent of the customer in the customer dialogue and an intent of the employee in the employee dialogue.

Figure 5:
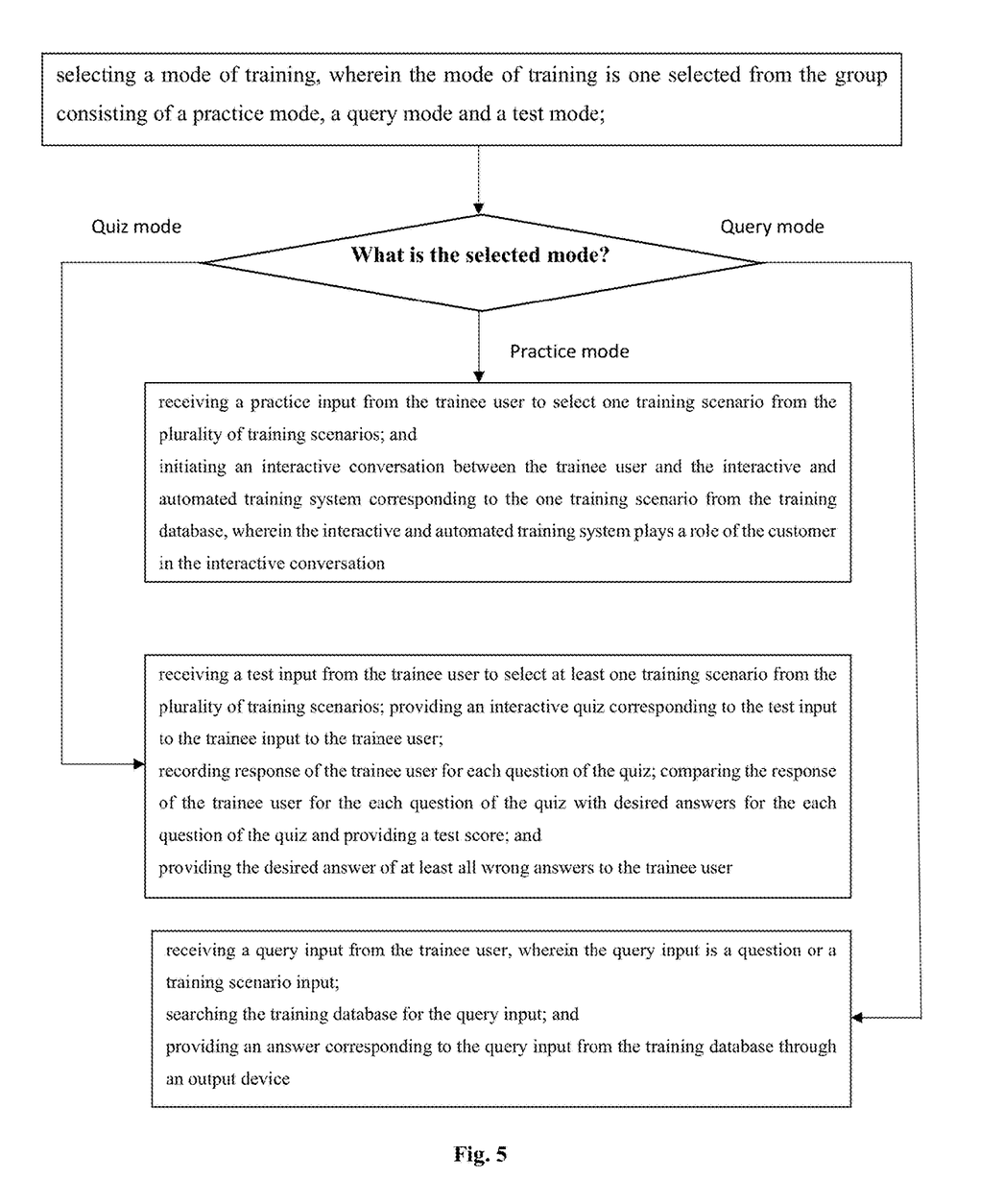
FIG. 5 shows a flowchart of a method for using the interactive and automated training system for training a new employee according to another embodiment.
Figure 6:
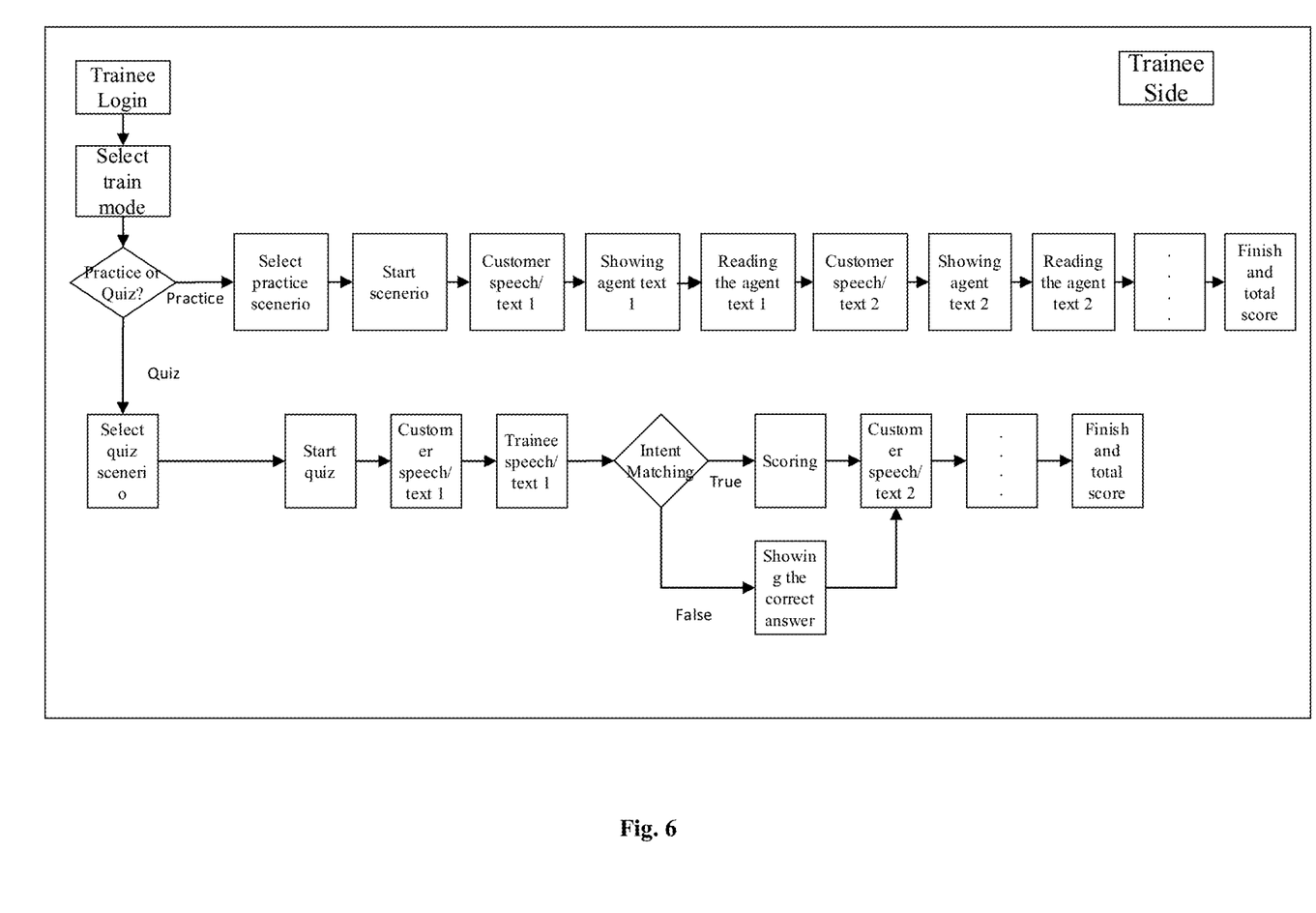
FIG. 6 shows a flowchart explaining a test mode of the interactive and automated training system according to another embodiment.

Referring to FIG. 5 and FIG. 6, a method for using the interactive and automated training system for training a new employee is provided. The method includes:
selecting a mode of training, wherein the mode of training is one selected from the group consisting of a practice mode, a query mode and a test mode;
when the mode of training is the practice mode:
receiving a practice input from the trainee user to select one training scenario from the plurality of training scenarios; and
initiating an interactive conversation between the trainee user and the interactive and automated training system corresponding to the one training scenario from the training database, wherein the interactive and automated training system plays a role of the customer in the interactive conversation;
when the mode of training is the query mode:

receiving a query input from the trainee user, wherein the query input is a question or a training scenario input;
searching the training database for the query input; and
providing an answer corresponding to the query input from the training database through an output device;
when the mode of training is the test mode:
receiving a test input from the trainee user to select at least one training scenario from the plurality of training scenarios;
providing an interactive quiz corresponding to the test input to the trainee input to the trainee user; recording response of the trainee user for each question of the quiz;
comparing the response of the trainee user for the each question of the quiz with desired answers for the each question of the quiz and providing a test score; and
providing the desired answer of at least all wrong answers to the trainee user.

Figure 7A:
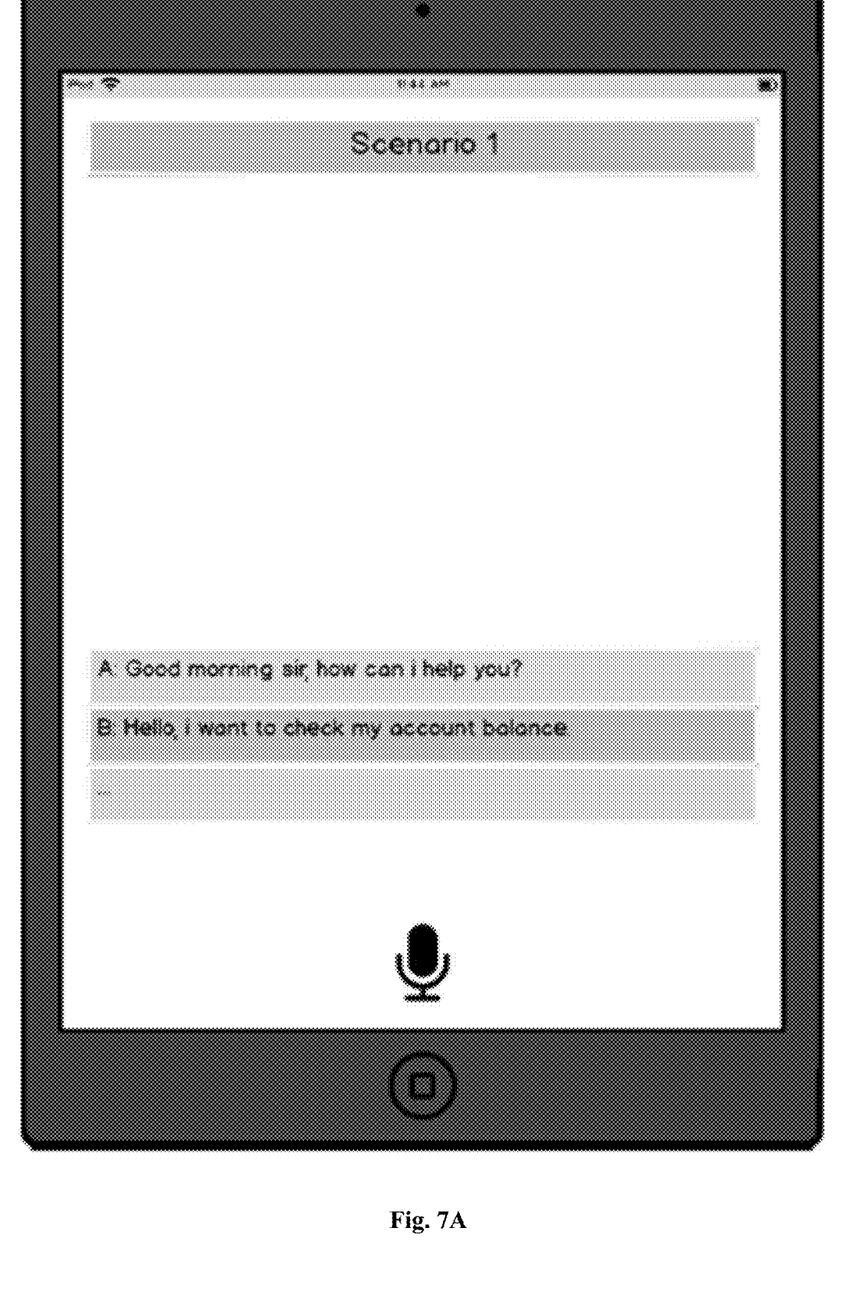
FIG. 7A, FIG. 7B, FIG. 7C and FIG. 7D shows a test scenario of a conversation.
Figure 7B:
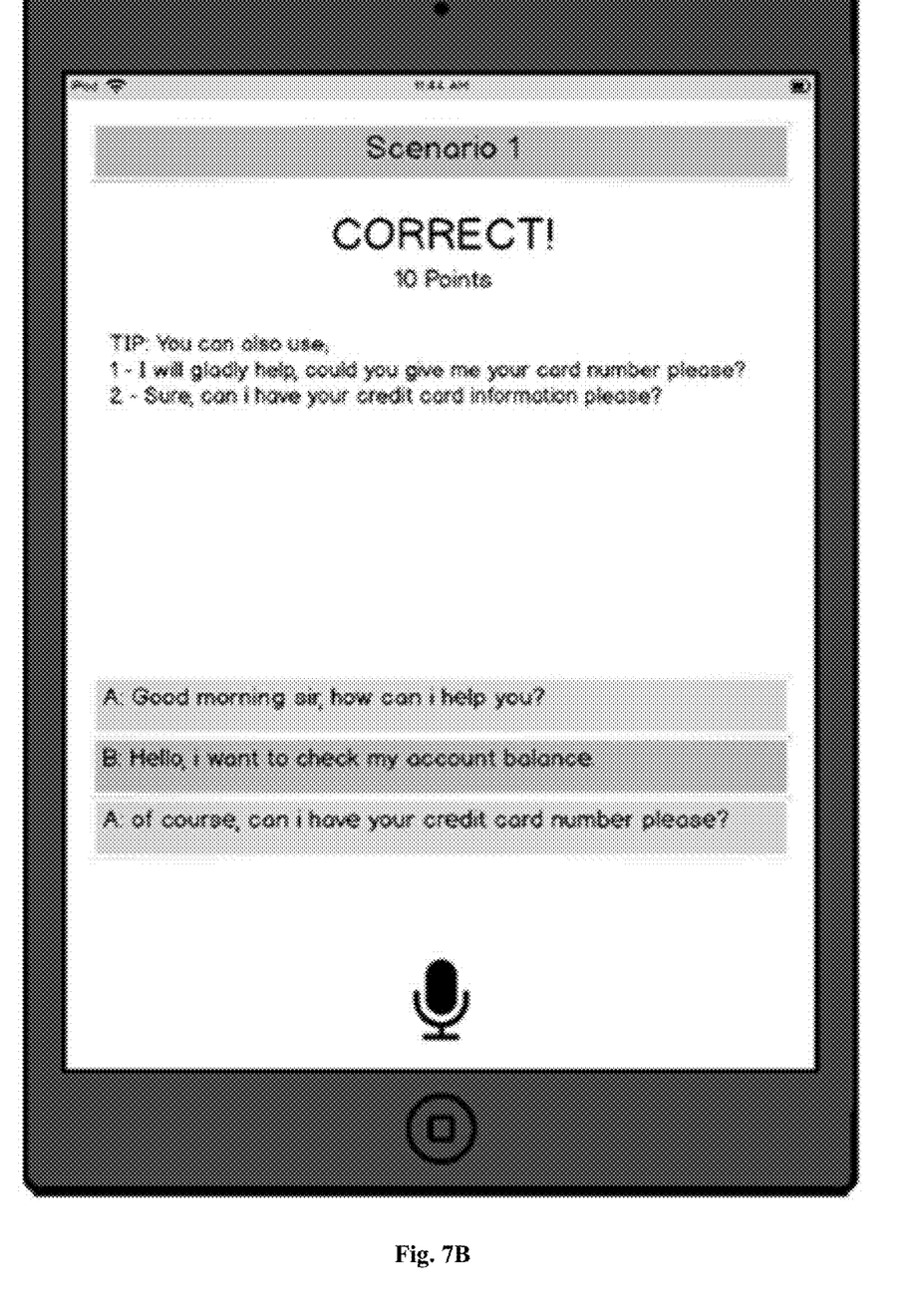
Figure 7C:
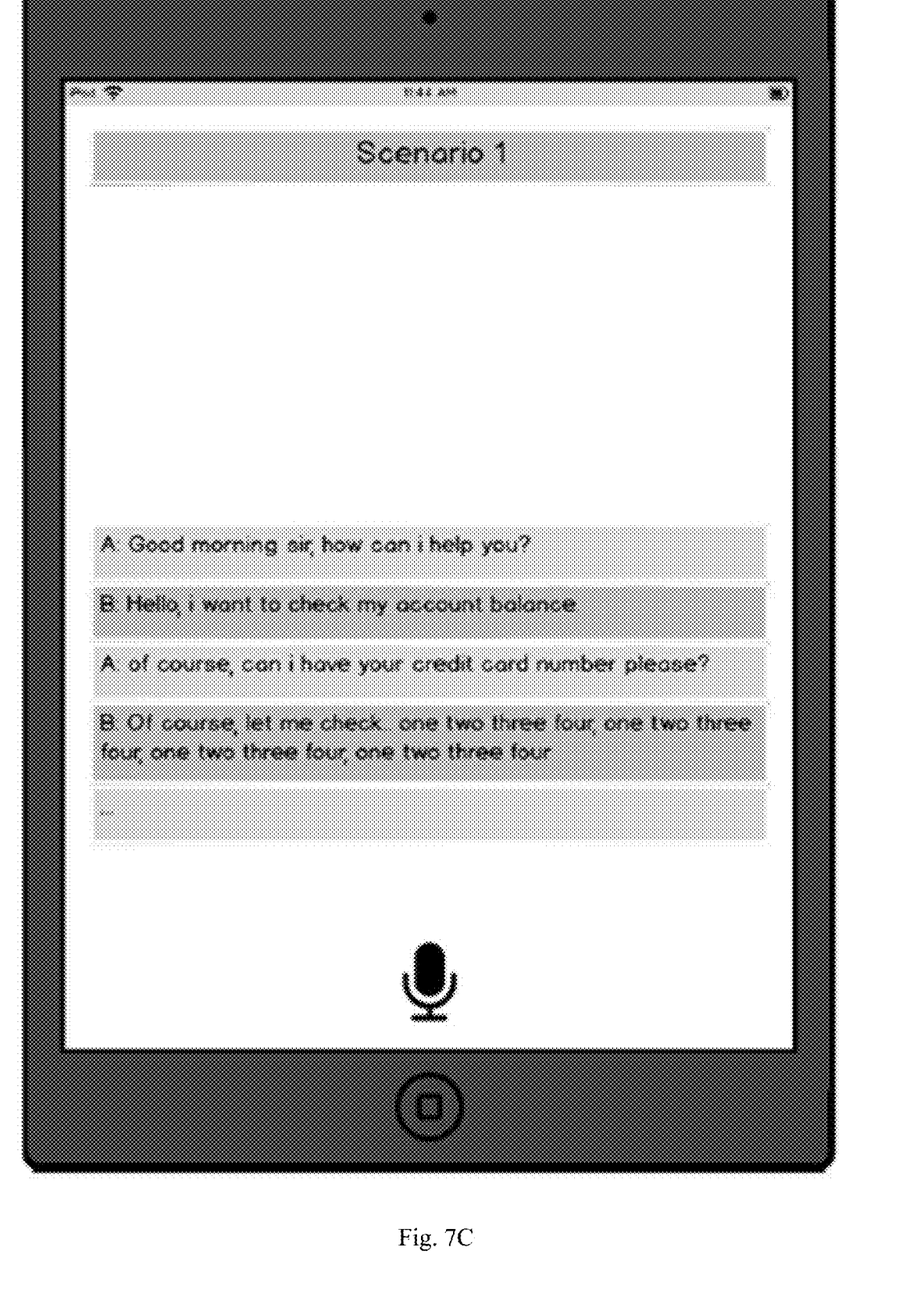
Figure 7D:
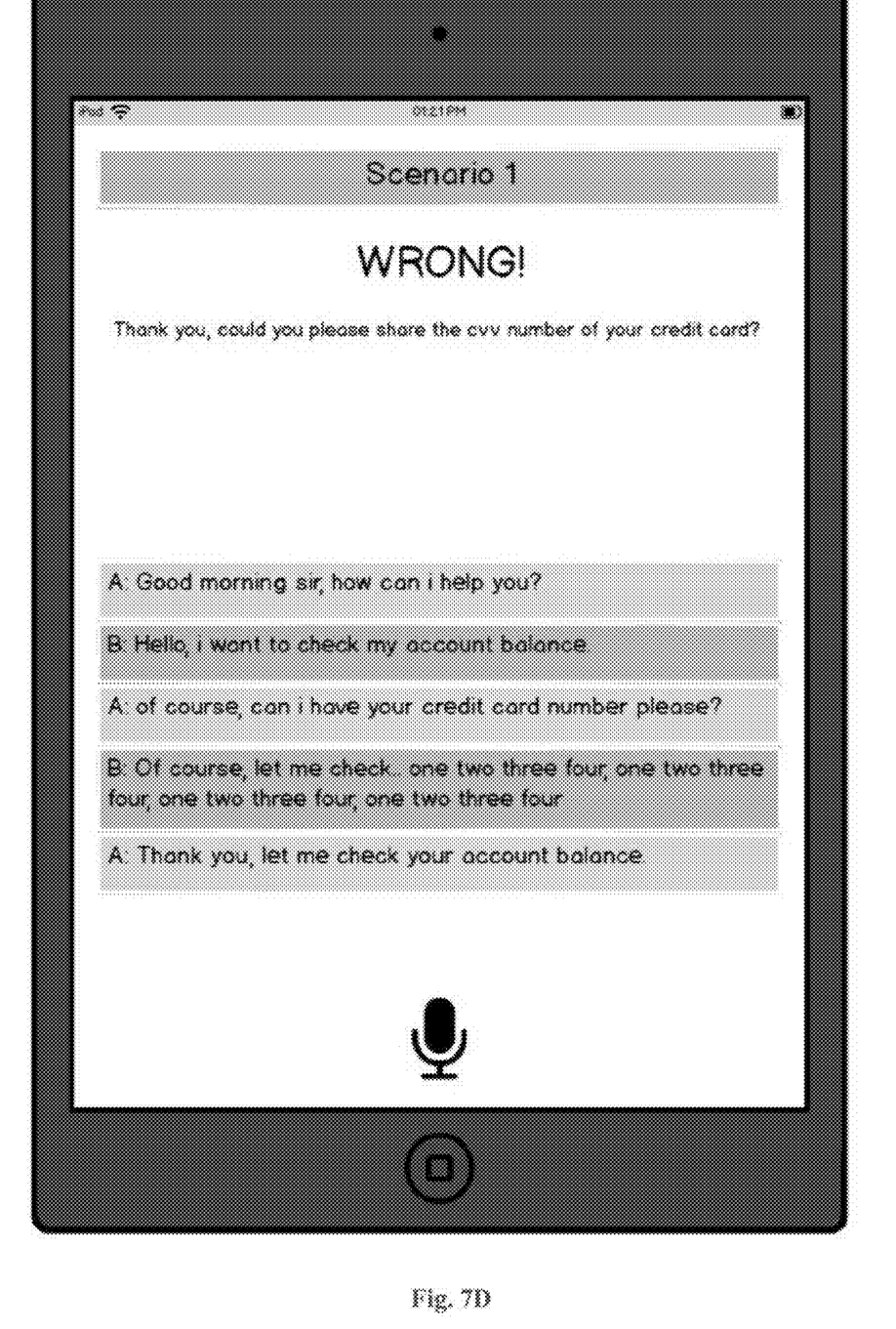

In another embodiment, the mode of training is the test mode and the interactive quiz is an interactive conversation stored in the training database corresponding to the training input. The response of the trainee user is compared with the employee dialogue of the interactive conversation stored in the training database corresponding to the training input and the answers are scored accordingly. Each question of the quiz has a specific weightage towards the total score of the quiz depending upon the importance of the question and considering how crucial each question is for that particular scenario. For example, the scenario includes a customer calling to enquire about the balance of his/her bank account or for doing a transaction using a credit card, the questions or response corresponding to asking proper authentication of the customer and his/her bank account or credit card will have more weightage than the responses for greetings like "hi", "hello", "how may I help you". Referring to FIGS. 7A-7D, an example of a scenario is explained, where a customer wants to check his/her account balance. FIG. 7A shows where the trainee user/employee greets the customer saying, "Good morning sir, how can i help you?". Customer replies by saying "Hello, I want to check my account balance". FIG. 7B shows if the trainee user/employee replies "of course, can I have your credit card number please?", it will be a correct response because the credit number is required to proceed ahead with the service. The system also displays some tips showing the quiz taker what can be similar other correct responses. For example, "I will gladly help, could you give me your card number please?" or "Sure, can I have your credit card information please?". So, such similar answers are also correct, and the neural networks analyzes each response to evaluate whether the response is similar to the response recorded in the database. So, even if the answer is not exactly the same as stored in the technical database, still the neural networks are able to identify if the answer is correct or not depending on algorithms, intent of the speaker, similarity of words and scenario of the particular conversation. FIG. 7C shows the reply of the customer, where customer provides the credit card number in order to proceed ahead. FIG. 7D shows a scenario, where the trainee user/employee on receiving the credit card number replies "Thank you, let me check your account balance". The reply "Thank you, let me check your account balance" may sound correct, but in fact it is wrong with respect to the scenario and the point of conversation where this reply was made. Although the customer provided the credit card number, but as per the guidelines, the trainee user/employee was supposed to authenticate whether the customer on the call is the person authorized to use that specific credit card. For example, the credit card number can be known to anyone who found a lost card. So, in this scenario the system will indicate that the answer or reply of the trainee user/employee is wrong. Additionally, the system will also prompt the trainee user/employee with the right answer or right response which was expected. As shown on top in FIG. 7D, the system displays "Thank you, could you please share the cvv number of the your credit card?". So, the system not only informs the trainee user/employee that his/her response was wrong but also guides him/her towards the right answer. So, in the test mode, the interactive and automated training system not only tests the knowledge and performance of the trainee user/employee, but also helps them to learn and gain knowledge and improve their performance.

In another embodiment, at the end of the interactive quiz, the interactive and automated training system displays a total test score of the trainee user.

In another embodiment, at the end of the interactive quiz, the interactive and automated training system displays the interactive conversation corresponding to the training input on a display screen.

In another embodiment, the method further includes adding the test score in a record of the trainee user stored in the training database and providing a snapshot of all test scores and a performance graph of the trainee user.

[48] The invention described herein is susceptible to variations, modifications and/or additions other than those specifically described, and it is to be understood that the invention includes all such variations, modifications and/or additions which fall within the spirit and scope of the above description.

We claim:

1. A method for using an interactive and automated training system for training a new employee, wherein the interactive and automated training system comprising:
   a training portal comprising a training database;
   a training material creating module comprising a recorder and a dialogue identifier;
   a training and practicing module for training and practicing interactively with a trainee user; and
   a testing module for providing test case scenarios and grading a performance level of the trainee user;
   wherein, the recorder is configured to record a real time interaction between an employee and a customer;
   wherein, the dialogue identifier is configured to differentiate the real time interaction into an employee dialogue and a customer dialogue, and provides indexing of subparts of the real time interaction;
   the training material creating module stores the real time interaction into the training database along with an indexing data of the subparts of the real time interaction;
   the training material creating module is configured to categorize a plurality of real time interactions stored in the training database into a plurality of training scenarios;
   the training database is accessible to the trainee user through the training and practicing module; and
   the training and practicing module comprises an output device for providing an output to the trainee user, and an input device for receiving an input from the trainee user for interactive training and practice;
   wherein the method comprising:
   selecting a mode of training, wherein the mode of training is one selected from the group consisting of a practice mode, a query mode and a test mode;
   when the mode of training is the practice mode:
   receiving a practice input from the trainee user to select one training scenario from the plurality of training scenarios; and initiating an interactive conversation between the trainee user and the interactive and automated training system corresponding to the one training scenario from the training database, wherein the interactive and automated training system plays a role of the customer in the interactive conversation;

when the mode of training is the query mode:
receiving a query input from the trainee user, wherein the query input is a question or a training scenario input;
searching the training database for the query input and providing an answer corresponding to the query input from the training database through an output device;

when the mode of training is the test mode:
receiving a test input from the trainee user to select at least one training scenario from the plurality of training scenarios;
providing an interactive quiz corresponding to the test input to the trainee user input to the trainee user;
recording response of the trainee user for each question of the quiz;
comparing the response of the trainee user for the each question of the quiz with desired answers for the each question of the quiz and providing a test score, wherein the desired answers include recorded answers and similar answers obtained by a neural network; and
providing the desired answer of all wrong answers to the trainee user.

2. The method according to claim 1, wherein the real time interaction is a written interaction or an oral interaction.

3. The method according to claim 1, wherein the real time interaction is an oral interaction, the recorder is an audio recorder and the dialogue identifier is a speech recognition device configured for differentiating voice of different speakers in the oral interaction.

4. The method according to claim 3, wherein the training material creating module further comprises a speech to text converter, the speech to text converter converts the oral interaction into a text and the training material creating module stores the text into the training database.

5. The method according to claim 3, wherein the training material creating system further includes a speaker diarisation system for differentiating the voice of different speakers.

6. The method according to claim 1, wherein the training database is configured to be amended directly by an input from a trainer.

7. The method according to claim 1, wherein the training and practicing module is configured to interact with the trainee user based on a training scenario selected by the trainee user from the plurality of training scenarios.

8. The method according to claim 7, wherein the testing module provides a test case scenario corresponding to the training scenario selected by the trainee user and records a response of the trainee user.

9. The method according to claim 8, wherein the testing module analyzes the response of the trainee user and is configured to provide a score based on a predetermined testing criteria.

10. The method according to claim 9, wherein the testing module compares an intent of the response of the trainee user with an intent of a desired response in the training database and provides the score based on a degree of match between the intent of the response of the trainee user and the predetermined response in the training database.

11. The method according to claim 10, wherein the testing module is configured to display the desired response to the user trainee.

12. The method of claim 1, wherein the mode of training is the test mode and the interactive quiz is an interactive conversation stored in the training database corresponding to a training input;
wherein the response of the trainee user is compared with the employee dialogue of the interactive conversation stored in the training database corresponding to the training input.

13. The method of claim 1, wherein at an end of the interactive quiz, the interactive and automated training system displays a total test score of the trainee user.

14. The method of claim 1, wherein at an end of the interactive quiz, the interactive and automated training system displays the interactive conversation corresponding to the training input on a display screen.

15. The method of claim 1, further comprising,
adding the test score in a record of the trainee user stored in the training database and providing a snapshot of all test scores and a performance graph of the trainee user.

* * * * *